(12) United States Patent
Suk

(10) Patent No.: US 10,247,553 B2
(45) Date of Patent: Apr. 2, 2019

(54) VIRTUAL SPORT SYSTEM USING START SENSOR FOR ACCURATE SIMULATION OF MOVEMENT OF A BALL

(71) Applicant: CREATZ INC., Seoul (KR)

(72) Inventor: Yong Ho Suk, Seongnam-si (KR)

(73) Assignee: CREATZ INC., Seoul (KR)

( * ) Notice: Subject to any disclaimer, the term of this patent is extended or adjusted under 35 U.S.C. 154(b) by 0 days.

(21) Appl. No.: 14/346,731

(22) PCT Filed: Sep. 24, 2012

(86) PCT No.: PCT/KR2012/007663
§ 371 (c)(1),
(2) Date: Mar. 23, 2014

(87) PCT Pub. No.: WO2013/043014
PCT Pub. Date: Mar. 28, 2013

(65) Prior Publication Data
US 2014/0228085 A1    Aug. 14, 2014

(30) Foreign Application Priority Data

Sep. 23, 2011  (KR) .................. 10-2011-0096352

(51) Int. Cl.
| | |
|---|---|
| A63B 69/36 | (2006.01) |
| G01C 11/02 | (2006.01) |
| A63F 13/20 | (2014.01) |
| G06T 7/20 | (2017.01) |
| A63B 24/00 | (2006.01) |

(Continued)

(52) U.S. Cl.
CPC .......... *G01C 11/02* (2013.01); *A63B 24/0021* (2013.01); *A63B 71/022* (2013.01); *A63F 13/005* (2013.01); *A63F 13/20* (2014.09); *G06T 7/20* (2013.01); *G06T 7/246* (2017.01); *A63B 69/3661* (2013.01); *A63B 2024/0031* (2013.01); *A63B 2024/0034* (2013.01); *G01C 2011/36* (2013.01); *G06T 2207/10016* (2013.01); *G06T 2207/10028* (2013.01);
(Continued)

(58) Field of Classification Search
CPC ......... A63F 13/005; G06T 2207/30241; G06T 7/20; A63B 2024/0034; A63B 71/022; A63B 69/3623; A63B 69/36; A63B 2220/807; A63B 2220/30; A63B 2220/05; A63B 2220/805; A63B 69/3658
See application file for complete search history.

(56) References Cited

U.S. PATENT DOCUMENTS

2002/0114493 A1*  8/2002  McNitt ................ A61B 5/1124
382/107
2003/0195052 A1* 10/2003  Cohen ................ A63B 24/0003
473/151

(Continued)

*Primary Examiner* — Justin L Myhr
(74) *Attorney, Agent, or Firm* — Dinsmore & Shohl LLP; Yongsok Choi, Esq.

(57) ABSTRACT

The present invention relates to a virtual sport system using a start sensor. One embodiment of the present invention provides a virtual sport system comprising: a hitting section from which a ball is hit; a start sensor unit which determines the physical quantity of the ball at the stage when the ball starts moving; and a simulation unit which receives, from the start sensor unit, information on the physical quantity, and simulates the motion of the ball on the basis of the information received.

5 Claims, 3 Drawing Sheets

(51) Int. Cl.
*A63B 71/02* (2006.01)
*A63F 13/00* (2014.01)
*G06T 7/246* (2017.01)
*G01C 11/36* (2006.01)

(52) U.S. Cl.
CPC .............. *G06T 2207/10048* (2013.01); *G06T 2207/30224* (2013.01); *G06T 2207/30241* (2013.01)

(56) References Cited

U.S. PATENT DOCUMENTS

| | | | | |
|---|---|---|---|---|
| 2007/0105637 | A1* | 5/2007 | Shimizu | A63B 24/0003 473/151 |
| 2007/0196800 | A1* | 8/2007 | Douthit | A63B 24/0003 434/252 |
| 2008/0242437 | A1* | 10/2008 | Taylor | A63B 24/0021 473/269 |
| 2010/0151957 | A1* | 6/2010 | Hohla | A63B 24/0003 473/221 |

* cited by examiner

VIRTUAL SPORT SYSTEM USING START SENSOR FOR ACCURATE SIMULATION OF MOVEMENT OF A BALL

FIELD OF THE INVENTION

The present invention relates to a virtual sport system using a start sensor.

BACKGROUND

Virtual golf systems are widely spreading which allow golfers to virtually play golf at low cost in downtown areas and the like. The basic concept of such virtual golf systems is to measure physical quantities of a golf ball upon being hit by a golfer, perform a simulation of the shot, and display a result of the simulation on a screen. In the virtual golf systems, it is important to accurately measure the physical quantities of the golf ball.

While there are many types of physical quantities of the golf ball, it may be important to accurately measure the physical quantities of the golf ball at the stage of starting movement, which may greatly affect the result of the simulation. However, conventional techniques have been insufficient for such measurement.

Following the introduction of a remarkable virtual golf system in Korean Patent No. 1048864 (entitled, "METHOD OF MEASURING PHYSICAL QUANTITIES OF OBJECT BY USING SINGLE LIGHT SOURCE AND PLANAR SENSOR UNIT AND VIRTUAL GOLF SYSTEM UTILIZING SAME") (the contents of which are incorporated herein by reference in its entirety), the inventor(s) now present a novel feature to combine with such virtual golf systems, other virtual golf systems, systems for virtually playing other kinds of sports (e.g., baseball, football, etc.), or the like to enable them to produce more accurate simulation results.

SUMMARY OF THE INVENTION

One object of the present invention is to accurately measure physical quantities of a ball at the stage of starting movement.

Another object of the invention is to enable a virtual sport system to produce a more accurate simulation result.

According to one aspect of the invention to achieve the objects as described above, there is provided a virtual sport system, comprising: a shot unit to allow a ball to be hit; a start sensor unit to derive information on physical quantities of the ball at the stage of starting movement; and a simulation unit to receive the information on the physical quantities from the start sensor unit and perform a simulation of the movement of the ball on the basis of the received information.

In addition, there may be further provided other systems to implement the present invention.

According to the invention, physical quantities of a ball at the stage of starting movement may be accurately measured.

According to the invention, a virtual sport system may produce a more accurate simulation result.

DETAILED DESCRIPTION OF THE PREFERRED EMBODIMENTS

Figure 1:
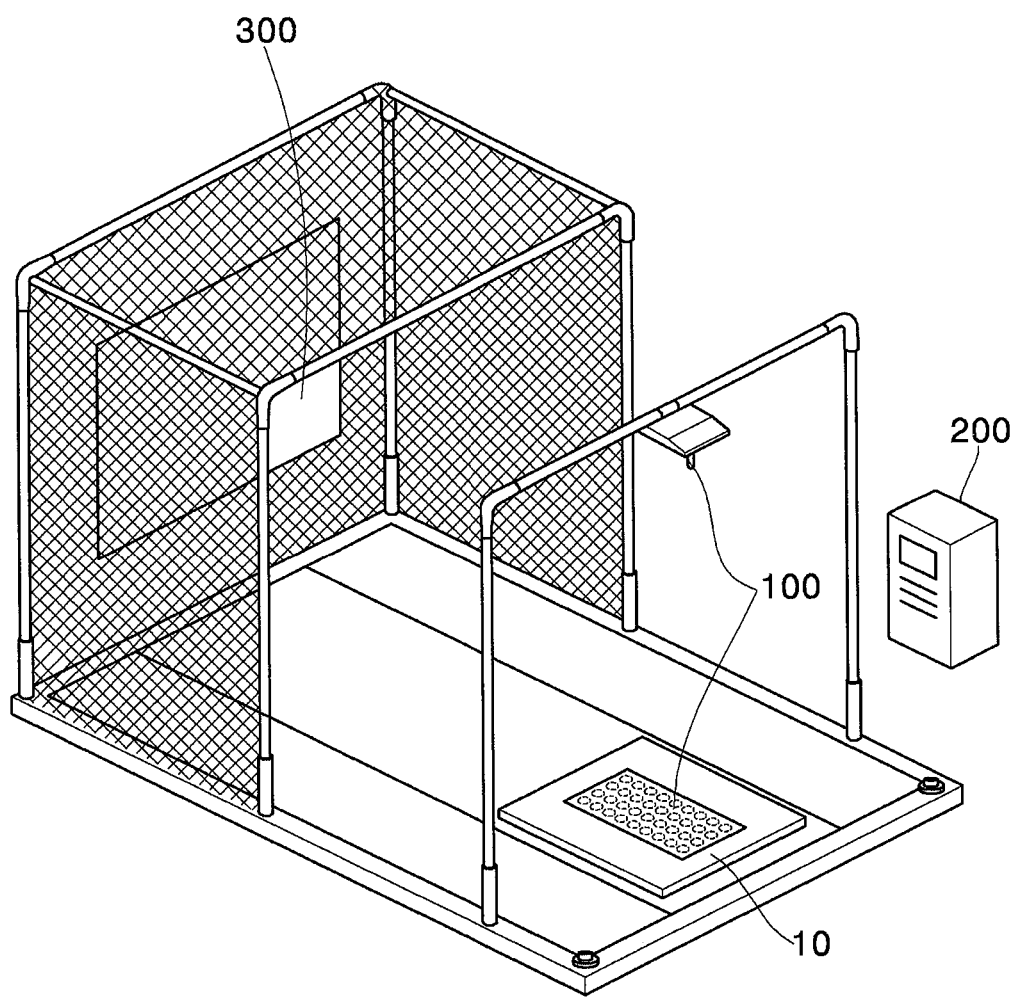
FIG. 1 is a schematic diagram of the overall configuration of a virtual golf system according to one embodiment of the invention.

In the following detailed description of the invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, or characteristics described herein may be implemented as modified from one embodiment to another embodiment without departing from the spirit and the scope of the invention. Furthermore, it shall be understood that the locations or arrangements of individual elements within each embodiment may be also modified without departing from the spirit and the scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of Overall System

FIG. 1 is a schematic diagram of the overall configuration of a virtual golf system according to one embodiment of the invention.

As shown in FIG. 1, the virtual golf system may be configured to comprise a shot unit 10, a start sensor unit 100, a simulator 200 and a display device 300.

First, the shot unit 10 according to one embodiment of the invention may be a part on which a golfer steps up to place and hit a golf ball when using the virtual golf system. The shot unit 10 may comprise a known swing plate, the tilt angle of which may be adjusted. It will be noted that when the invention is applied to other kinds of virtual sport systems, those skilled in the art may modify the configuration of the shot unit 10 and, if necessary, those of other components associated therewith to suit to the characteristics of the corresponding sports.

Next, the start sensor unit 100 according to one embodiment of the invention may perform a function to measure physical quantities of the golf ball at the stage of starting movement and transmit information on the physical quantities to the simulator 200. To this end, the start sensor unit 100 may is comprise at least one, preferably a plurality of optical sensors (e.g., cameras, light sensors, etc.) or at least one, preferably a plurality of weight sensors. The detailed configuration of the start sensor unit 100 will be further described later with reference to FIG. 2.

Next, the simulator 200 according to one embodiment of the invention may perform a function to receive from the start sensor unit 100 the information on the physical quantities of the golf ball at the stage of starting movement and perform a simulation of the movement of the golf ball using the information. The simulator 200 may be similar to conventional virtual golf simulation devices.

The simulator 200 may communicate with the start sensor unit 100 and the display device 300, and may comprise a dedicated processor for virtual golf simulation. The dedicated processor may be provided with memory means and have numerical operation and graphics processing capabilities.

The configuration of the simulator 200 will be further described later with reference to FIG. 3.

Lastly, the display device 300 according to one embodiment of the invention may perform a function to display a result of the numerical operation or graphics processing of the simulator 200. The display device 300 may display images via display means, and may preferably be configured with a screen, which absorbs the impact of the hit golf ball and does not emit light directly, and a projector to output images on the screen.

Configuration of Start Sensor Unit

Hereinafter, the internal configuration of the start sensor unit 100 according to one embodiment of the invention and the functions of the respective components thereof will be described.

Figure 2:
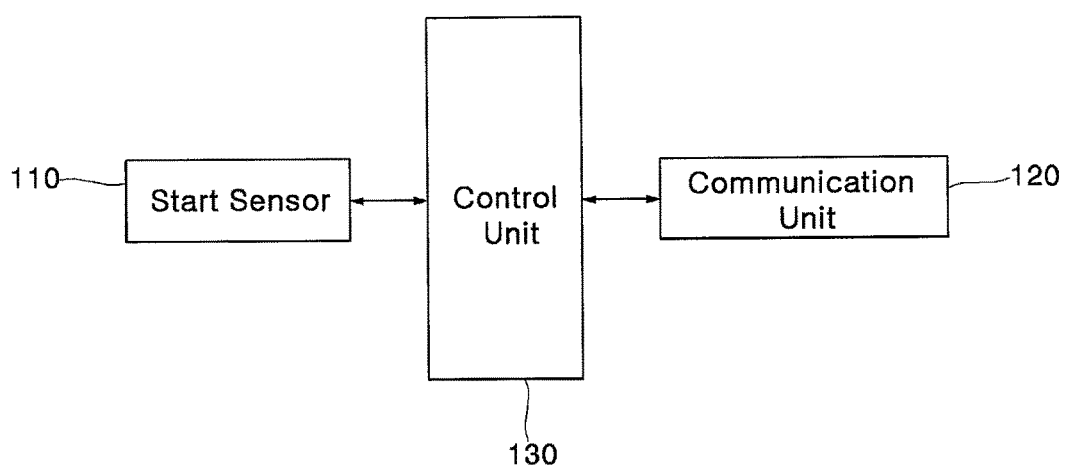
FIG. 2 is a detailed diagram of the internal configuration of a start sensor unit 100 according to one embodiment of the invention.

FIG. 2 is a detailed diagram of the internal configuration of the start sensor unit 100 according to one embodiment of the invention.

As shown in FIG. 2, the start sensor unit 100 may be configured to comprise a start sensor 110, a communication unit 120 and a control unit 130.

According to one embodiment of the invention, at least some of the start sensor 110, the communication unit 120 and the control unit 130 may be program modules to communicate with the simulator 200. The program modules may be included in the start sensor unit 100 in the form of operating systems, application program modules or other program modules, while they may be physically stored in a variety of commonly known storage devices. Further, the program modules may also be stored in a remote storage device that may communicate with the start sensor unit 100. Meanwhile, such program modules may include, but not limited to, routines, subroutines, programs, objects, components, data structures and the like for performing specific tasks or executing specific abstract data types as will be described below in accordance with the present invention.

First, the start sensor 110 may be configured with at least one, preferably a plurality of optical sensors (e.g., cameras, light sensors, etc.) disposed above the shot unit 10, or at least one, preferably a plurality of weight sensors disposed on the top surface of the shot unit 10.

The start sensor 110 may perform detection to decide whether a golf ball is disposed in a normal shot area on the shot unit 10 or to determine where the golf ball is disposed in the normal shot area on the shot unit 10. The normal shot area may be a predetermined virtual area covered by the optical sensors above the shot unit 10, or a predetermined substantial area covered by the weight sensors on the top surface of the shot unit 10. In any case, the normal shot area may be divided into a plurality of sections. For example, if the start sensor 110 employs the optical sensors, the normal shot area on the shot unit 10 may be configured with a plurality of virtual sections corresponding to a plurality of coordinates at which an image of the golf ball may be detected. For another example, if the start sensor 110 employs the weight sensors, the normal shot area on the top surface of the shot unit 10 may be configured with a plurality of substantial sections at each of which the weight sensor is disposed.

First, the start sensor 110 may detect whether there is an image of the golf ball in the normal shot area or whether a weight corresponding to the golf ball (e.g., a weight similar to that of a common golf ball within a certain range) is applied in the normal shot area, by means of the sensors thereof. (That is, the start sensor 110 may perform detection to decide whether the golf ball is disposed in the normal shot area.) Thereafter, the start sensor 110 may transmit the corresponding data to the control unit 130.

Further, if an image of the golf ball or a weight corresponding to the golf ball is detected with respect to a specific section (that is, the start sensor 110 may perform detection to determine where the golf ball is disposed in the normal shot area), then the start sensor 110 may transmit the corresponding data to the control unit 130.

Meanwhile, it is possible that an image of the golf ball or a weight corresponding to the golf ball is detected with respect to two or more sections (apart from each other). (In many cases, this may occur when there is a detection error in the start sensor 110 or when an object other than the golf ball that a golfer intends to hit is disposed in the normal shot area.) In this case, the control unit 130 to be described below may only acknowledge, among the above corresponding data, those having been continuously received for or longer than a certain reference time duration.

Meanwhile, it is possible that an image of the golf ball or a weight corresponding to the golf ball is detected over two or more adjacent sections. In this case, the control unit 130 to be described below may only choose one of the two or more sections where a valid image size or weight of the golf ball is detected.

Next, the communication unit 120 may perform a function to mediate data transmission/receipt between the control unit 130 and the simulator 200. Although there is no particular limitation on the communication modality that may be employed by the communication unit 120, wired communication such as wired LAN communication and cable communication, or wireless communication such as wireless LAN communication, infrared communication, RF communication and Bluetooth communication may preferably be employed.

Lastly, the control unit 130 may perform a function to derive information on the physical quantities of the golf ball at the stage of starting movement on the basis of the data from the start sensor 110 and transmit it to the simulator 200. Preferably, the control unit 130 may be a processor with simple data processing capability.

The control unit 130 may decide whether the golf ball is disposed in the normal shot area or determine where the golf ball is disposed in the normal shot area on the basis of the data from the start sensor 110, and transmit the information to the simulator 200.

Further, the control unit 130 may determine when the golf ball is hit on the basis of the data from the start sensor 110. That is, when the data are no longer received which have been being received from the start sensor 110 indicating that an image or weight of the golf ball is detected with respect to a specific section, the control unit 130 may determine that point of time to be when the golf ball is hit, and transmit the information to the simulator 200.

Further, the control unit 130 may also determine the section where the image or weight of the golf ball was detected immediately before the above point of time to be the section where the golf ball was located, and transmit the is location information thereon to the simulator 200.

Configuration of Simulator

Hereinafter, the internal configuration of the simulator 200 according to one embodiment of the invention and the functions of the respective components thereof will be described.

Figure 3:
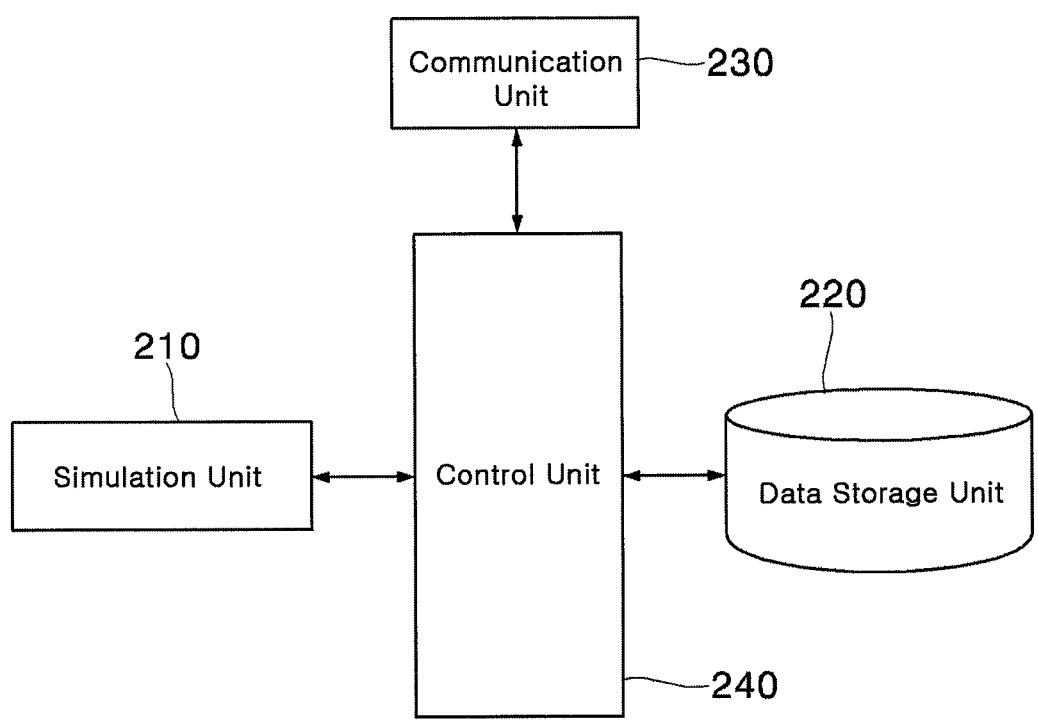
FIG. 3 is a detailed diagram of the internal configuration of a simulator 200 according to one embodiment of the invention.

FIG. 3 is a detailed diagram of the internal configuration of the simulator 200 according to one embodiment of the invention.

As shown in FIG. 3, the simulator 200 according to one embodiment of the invention may be configured to comprise a simulation unit 210, a data storage unit 220, a communication unit 230 and a control unit 240.

According to one embodiment of the invention, at least some of the simulation unit 210, the data storage unit 220, the communication unit 230 and the control unit 240 may be program modules to communicate with the start sensor unit 100 or the display device 300. The program modules may be included in the simulator 200 in the form of operating systems, application program modules or other program modules, while they may be physically stored in a variety of commonly known storage devices. Further, the program modules may also be stored in a remote storage device that may communicate with the simulator 200. Meanwhile, such program modules may include, but not limited to, routines, subroutines, programs, objects, components, data structures and the like for performing specific tasks or executing specific abstract data types as will be described below in accordance with the present invention.

First, the simulation unit 210 may receive information from the start sensor unit 100 and perform a virtual golf simulation on the basis thereof. That is, the simulation unit 210 may receive information on, for example, when the golf ball is hit, where the golf ball is disposed immediately before being hit, or whether the golf ball is disposed in the normal shot area, and utilize the information as input information of the simulation.

Examples of how the simulation unit 210 may utilize the above information are as follow:

1. Calculating a Plane Angle, Elevation Angle and Speed of the Movement of a Golf Ball Conventional virtual golf systems perform simulation assuming that the initial position of a golf ball is fixed in a location where a golfer usually hits the golf ball (e.g., the location of a tee). However, the position of the golf ball at the stage of starting movement is actually changed slightly every time, except when the golfer hits a tee shot. Therefore, if the simulation unit 210 accurately reflects in the simulation the information on where the golf ball is disposed immediately before being hit, then a plane angle (at which the initial movement of the golf ball is seen in the direction from the sky to the ground), elevation angle (at which the initial movement of the golf ball is seen from the side) and speed of the initial movement of the golf ball may be calculated more accurately. However, in order to calculate the angles of the initial movement of the golf ball, the data from other conventional sensors may be required together. Further, in order to calculate the speed of the initial movement of the golf ball, the data from other conventional sensors and the information on when the golf ball is hit may be required together.

2. Calculating a Height of a Golf Ball

Even when the tilt angle of a swing plate does not become zero at the stage of starting movement of a golf ball, conventional virtual golf systems have not substantially considered that the height of the golf ball is accordingly changed. However, a more accurate simulation result may be produced if the simulation unit 210 accurately determines the height of the golf ball at the stage of starting movement, with reference to the information on where the golf ball is disposed immediately before being hit as well as the tilt angle of the shot unit 10 and the location of the tilt center, and reflects it in the simulation.

Meanwhile, if it is determined that the golf ball is disposed out of the normal shot area or an object other than the golf ball is disposed in the normal shot area, the simulation unit 210 may control the display device 300 to display a notification thereon.

Meanwhile, the simulation unit 210 may transmit to the display device 300 a control signal reflecting the movement of the golf ball in a graphical object or containing a video signal, so that the movement of the golf ball may be realistically displayed in the display device 300.

Next, the data storage unit 220 may store information on the above-mentioned physical quantities of the golf ball at the stage of starting movement, or information required for the simulation. The data storage unit 220 may comprise a computer-readable recording medium.

Next, the communication unit 230 may perform a function to enable data transmission/receipt to/from the simulation unit 210 and the data storage unit 220. Although there is no particular limitation on the communication modality that may be employed by the communication unit 230, wired communication such as wired LAN communication and cable communication, or wireless communication such as wireless LAN communication, infrared communication, RF communication and Bluetooth communication may preferably be employed.

Lastly, the control unit 240 may perform a function to control data flow among the simulation unit 210, the data storage unit 220 and the communication unit 230. That is, the control unit 240 according to the present invention may control data flow into/out of the simulator 200 or data flow among the respective components of the simulator 200, such that the simulation unit 210, the data storage unit 220 and the communication unit 230 may carry out their particular functions, respectively.

Although it has been mainly described above that the system of the present invention is a virtual golf system, it will be apparent to those skilled in the art that the technical principle and configuration of the invention may be applied to all kinds of virtual sport systems (e.g., virtual baseball systems or virtual football systems) requiring simulation of the movement of a ball.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described in terms of specific items such as detailed elements as well as the limited embodiments and the drawings, they are only provided to help general understanding of the invention, and the present invention is not limited to the above embodiments. It will be appreciated by a person of ordinary skill in the art that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A virtual sport system, comprising:
   a shot unit to allow a ball to be hit;
   a start sensor unit to derive information on physical quantities of the ball at the stage of starting movement; and
   a simulation unit to receive the information on the physical quantities from the start sensor unit and perform a simulation of the movement of the ball on the basis of the received information,
   wherein the start sensor unit comprises at least one optical sensor or a plurality of weight sensors,
   wherein the information on the physical quantities of the ball at the stage of starting movement includes information on where the ball is disposed in a normal shot area, information on when the ball is hit, and information on where the ball is disposed immediately before being hit,
   wherein the start sensor unit determines the information on where the ball is disposed in the normal shot area on the basis of an image of the ball in the normal shot area, which is detected by the at least one optical sensor, or on the basis of a weight corresponding to the ball applied in the normal shot area, which is detected by the plurality of weight sensors,
   wherein the normal shot area is a predetermined virtual area covered by the at least one optical sensor, or a predetermined substantial area covered by the plurality of weight sensors,
   wherein the virtual area is configured with a plurality of virtual sections corresponding to a plurality of coordinates at which the image of the ball may be detected by the at least one optical sensor,
   wherein the substantial area is configured with a plurality of substantial sections at each of which each weight sensor of the plurality of weight sensors is disposed,
   wherein the start sensor unit determines a point of time the ball is no longer detected, which has been detected with respect to a specific section of the plurality of sections, to be when the ball is hit, and
   wherein the simulation unit includes program modules stored in memory devices that, when executed by a processor, cause the simulation unit to receive a tilt angle of the shot unit and a location of a tilt center of the shot unit from the start sensor unit and calculate a height of the ball at the stage of starting movement with reference to the information on where the ball is disposed immediately before being hit, the tilt angle of the shot unit, and the location of the tilt center of the shot unit.

2. A virtual sport system as claimed in claim 1, wherein the at least one optical sensor is disposed above the shot unit.

3. A virtual sport system as claimed in claim 1, wherein the at least one weight sensor is disposed on the top surface of the shot unit.

4. A virtual sport system as claimed in claim 1, wherein when the ball is detected with respect to two or more of the plurality of sections, the start sensor unit only acknowledges, among the corresponding data, those having been received for or longer than a reference time duration.

5. A virtual sport system as claimed in claim 1, wherein the simulation unit further calculates a plane angle, elevation angle and speed of the initial movement of the ball with reference to the information on the physical quantities.

* * * * *